S. Z. HALL.
Churn.
No. 45,155.
Patented Nov. 22, 1864.
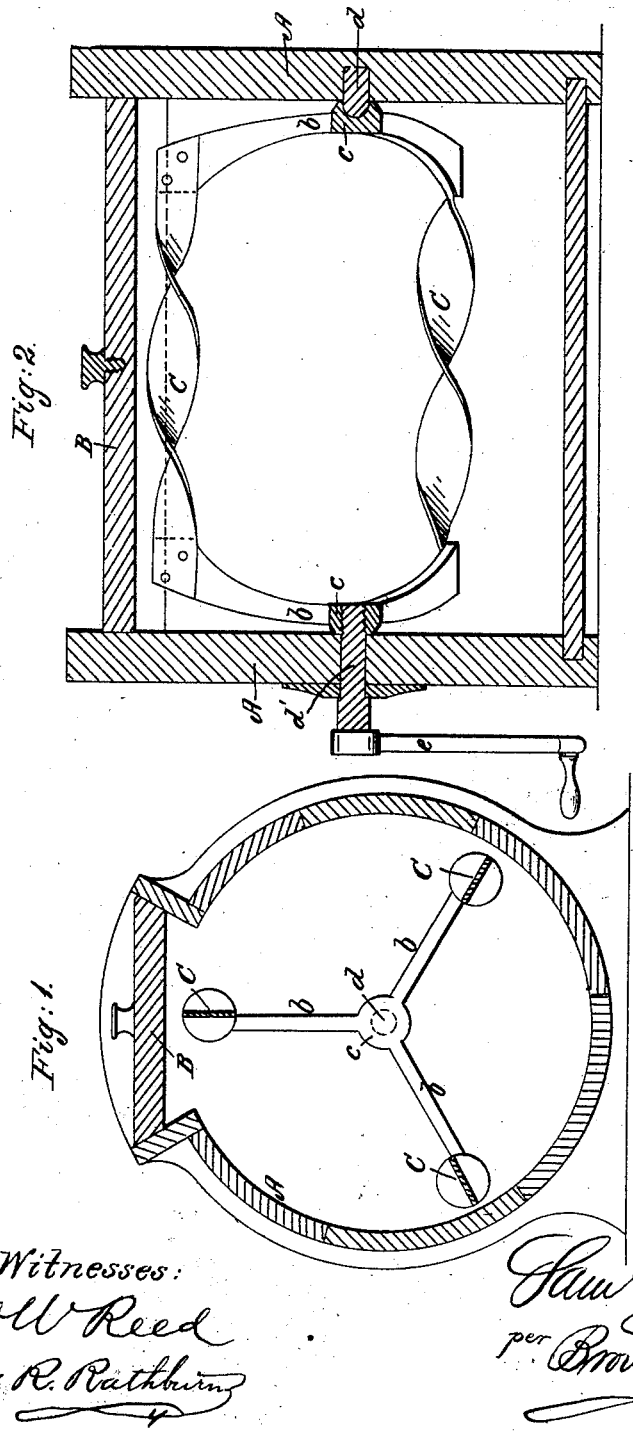
Witnesses:
Geo W Reed
Frank R. Rathbun
Inventor:
Saml. Z. Hall
per Brown Coombs
Attys.

UNITED STATES PATENT OFFICE.

SAMUEL Z. HALL, OF CAMDEN, NEW JERSEY.

IMPROVEMENT IN CHURNS.

Specification forming part of Letters Patent No. 45,155, dated November 22, 1864.

*To all whom it may concern:*

Be it known that I, SAMUEL Z. HALL, of Camden, in the county of Camden and State of New Jersey, have invented a new and useful Improvement in Churns; and I do hereby declare that the following is a full, clear, and exact description of the same, reference being had to the accompanying drawings, forming part of this specification, in which—

Figure 1 is a transverse vertical section of a churn constructed according to my invention. Fig. 2 is a longitudinal vertical section of the same.

Similar letters of reference indicate corresponding parts in both figures.

This invention consists in the employment, in a rotary churn, of one or more revolving twisted dashers arranged at a distance from the axis of revolution.

To enable others skilled in the art to make and use my invention, I will proceed to describe its construction and operation.

A is a horizontally-arranged barrel-like vessel, made with suitable feet for its support, and provided at the top with a suitable opening, $a$, for the introduction of the milk and removal of the butter, said opening being fitted with a removable cover, B.

C C are the revolving twisted dashers, of which three are represented. These may be made of strips of sheet metal, twisted as shown in Fig. 1, and their ends are secured to the extremities of two sets of arms, $b\ b$, radiating from central hubs, $c\ c'$, which are provided with journals $d\ d'$, fitted to bearings in the ends of the vessel A. The journal $d$ extends through its respective head of the vessel, and is furnished outside with a crank, $e$. This journal screws into its respective hub, $c'$, so that by being unscrewed therefrom it is permitted to be drawn out to permit the removal of the dashers and their connected arms and hubs through the opening $a$.

By turning the crank $e$ the twisted dashers are caused to revolve around the common axis of the journals $d\ d'$, and near the walls of the vessel A, and to produce such an agitation of the milk as is very effective in forming and separating the butter.

The great advantage of this system and arrangement of twisted dashers is that while they produce a most effective agitation their revolution is produced with a very small application of power, and it makes but little difference to the operation how little or how much milk the vessel A may contain.

I am aware that a churn has been made with a spiral dasher. Therefore do not claim, broadly, such a dasher; but

What I claim as my invention, and desire to secure by Letters Patent, is—

The employment, in a churn, of one or more revolving twisted dashers arranged at a distance from the axis of revolution, substantially as herein specified.

SAML. Z. HALL.

Witnesses:
HENRY T. BROWN,
J. W. COOMBS.